(12) United States Patent  
Nesbitt et al.

(10) Patent No.: US 6,376,612 B1
(45) Date of Patent: Apr. 23, 2002

(54) GOLF BALL

(75) Inventors: R. Dennis Nesbitt, Westfield; Mark L. Binette, Ludlow, both of MA (US); Michael J. Sullivan, Old Lyme, CT (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/490,178

(22) Filed: Jan. 22, 2000

Related U.S. Application Data (63) Continuation-in-part of application No. 09/226,340, filed on Jan. 6, 1999, now Pat. No. 6,277,920, which is a continuation-in-part of application No. 08/819,945, filed on Mar. 18, 1997, now Pat. No. 5,895,105, which is a continuation of application No. 08/370,224, filed on Jan. 9, 1995, now abandoned, which is a continuation of application No. 07/893,277, filed on Jun. 4, 1992, now abandoned, which is a continuation-in-part of application No. 07/874,066, filed on Apr. 24, 1992, now abandoned.

(60) Provisional application No. 60/116,846, filed on Jan. 22, 1999, provisional application No. 60/117,328, filed on Jan. 22, 1999, provisional application No. 60/116,900, filed on Jan. 22, 1999, provisional application No. 60/116,901, filed on Jan. 22, 1999, provisional application No. 60/116,899, filed on Jan. 22, 1999, and provisional application No. 60/116,870, filed on Jan. 22, 1999.

(51) Int. Cl.⁷ .............................. A63B 37/06; C08L 9/00
(52) U.S. Cl. ................. 525/236; 525/193; 473/371; 473/372; 473/373
(58) Field of Search ................. 525/193, 236; 473/371, 372, 373, 377

(56) References Cited

U.S. PATENT DOCUMENTS

| | | |
|---|---|---|
| 3,421,766 A | 1/1969 | Chmiel et al. |
| 3,432,165 A | 3/1969 | Haines et al. |
| 3,478,132 A | 11/1969 | Randolph |
| 3,572,721 A | 3/1971 | Harrison et al. |
| 3,883,145 A | 5/1975 | Cox et al. |
| 4,076,255 A | 2/1978 | Moore |
| 4,082,288 A | 4/1978 | Martin et al. |
| 4,264,075 A | 4/1981 | Miller et al. |
| 4,266,772 A | 5/1981 | Martin et al. |
| 4,328,133 A | 5/1982 | Ogawa et al. |
| 4,683,257 A | 7/1987 | Kakiuchi et al. |
| 4,696,475 A | 9/1987 | Tomita et al. |
| 4,721,749 A * | 1/1988 | Odar |
| 4,726,590 A | 2/1988 | Molitor |
| 4,838,556 A | 6/1989 | Sullivan |
| 4,844,471 A | 7/1989 | Terence et al. |
| 4,852,884 A | 8/1989 | Sullivan |
| 4,929,678 A | 5/1990 | Hamada et al. |
| 4,931,376 A | 6/1990 | Hattori et al. |
| 4,955,613 A | 9/1990 | Gendreau et al. |
| 4,974,852 A | 12/1990 | Hiraoka et al. |
| 4,984,803 A | 1/1991 | Llort et al. |
| 4,986,545 A | 1/1991 | Sullivan |
| 5,082,285 A | 1/1992 | Hamada et al. |
| 5,098,105 A | 3/1992 | Sullivan |
| 5,120,791 A | 6/1992 | Sullivan |
| 5,131,662 A | 7/1992 | Pollitt |
| 5,187,013 A | 2/1993 | Sullivan |
| 5,209,485 A | 5/1993 | Nesbitt et al. |
| 5,215,308 A | 6/1993 | Hiraoka |
| 5,306,760 A | 4/1994 | Sullivan |
| 5,312,857 A | 5/1994 | Sullivan |
| 5,324,783 A | 6/1994 | Sullivan |
| 5,328,959 A | 7/1994 | Sullivan |
| 5,330,837 A | 7/1994 | Sullivan |
| 5,338,610 A | 8/1994 | Sullivan |
| RE35,293 E | 7/1996 | Hiraoka et al. |
| 5,542,677 A | 8/1996 | Sullivan et al. |
| 5,548,045 A | 8/1996 | Goto et al. |
| 5,580,057 A | 12/1996 | Sullivan et al. |
| 5,585,440 A | 12/1996 | Yamada et al. |
| 5,591,803 A | 1/1997 | Sullivan et al. |
| 5,733,206 A | 3/1998 | Nesbitt et al. |

FOREIGN PATENT DOCUMENTS

| | | |
|---|---|---|
| CA | 674595 | 11/1963 |
| CA | 713631 | 7/1965 |
| GB | 963380 | 6/1978 |
| GB | 2278609 | * 12/1994 |

* cited by examiner

Primary Examiner—David J. Buttner (57) ABSTRACT

A golf ball core formed from a composition including a (i) cobalt catalyzed polybutadiene and (ii) a blend of lanthanide catalyzed polybutadienes having Mooney viscosities of about 30–70.

18 Claims, 2 Drawing Sheets

GOLF BALL

CROSS REFERENCE TO RELATED APPLICATIONS

This application claims the benefit of the filing date of U.S. Provisional Applications No. 60/116, 846, filed Jan. 22, 1999; No. 60/117,328, filed Jan. 22, 1999; No. 60/116,900, filed Jan. 22, 1999; No. 60/116,901, filed Jan. 22, 1999; No. 60/116,899, filed Jan. 22, 1999; and No. 60/116,870, filed Jan. 22, 1999. This application is also a continuation-in-part of U.S. application Ser. No. 09/226,340, filed Jan. 6, 1999 now U.S. Pat. No. 6,277,920, which is a continuation-in-part of U.S. application Ser. No. 08/819,945, filed Mar. 18, 1997 now U.S. Pat. No. 5,895,105; which is a continuation of U.S. application Ser. No. 08/370,224 filed Jan. 9, 1995 now abandoned; which is a continuation of U.S. application Ser. No. 07/893,277 filed Jun. 4, 1992 now abandoned; and which is a continuation-in-part of U.S. application Ser. No. 07/874,066 filed on Apr. 24, 1992 now abandoned.

FIELD OF THE INVENTION

The present invention is directed to improved polybutadiene compositions for use in molded golf ball cores. The improved polybutadiene compositions utilize a particular solid butadiene rubber that exhibits an ultra-high Mooney viscosity and/or a high molecular weight and a low dispersity. The use of such butadiene rubber increases the resiliency of the ball without increasing the hardness of the ball. The present invention is also directed to golf cores and balls produced by utilizing the improved polybutadiene compositions.

BACKGROUND OF THE INVENTION

Two of the principal properties involved in the performance of golf balls are resilience and hardness. Resilience is determined by the coefficient of restitution (referred to as "C.O.R."), also expressed as the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter. The lower the compression value, the harder the material.

Resilience (C.O.R.), along with additional factors such as clubhead speed, angle of trajectory, and ball configuration (i.e. dimple pattern), generally determine the distance a ball will travel when hit. Since clubhead speed and the angle of trajectory are factors not easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and electronically measuring the ball's incoming and outgoing velocity. The coefficient of restitution must be carefully controlled in all commercial golf balls in order for the ball to be within the specifications regulated by the United States Golfers Association ("U.S.G.A."). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

Polybutadiene has been utilized in forming golf ball cores. Prior artisans have investigated utilizing various grades of polybutadiene in core compositions. For example, such attempts are described in U.S. Pat. Nos. 4,929,678; 4,974,852; 5,082,285; and 5,585,440, all of which are hereby incorporated by reference. Although some of the core compositions described in these patents are satisfactory, a need remains for an improved composition for forming golf ball cores.

For example, U.S. Pat. No. 4,929,678 relates to a golf ball formed from a polybutadiene core composition having a broad Mooney viscosity of 45–90, preferably 50–70, and more preferably 55 to 65. However the dispersity of the core composition is limited to the range of 4.0 to 8.0, and preferably 4.0 to 6.0. According to the '678 patent, a dispersity of less then 4.0 produces deleterious workability.

Similarly, U.S. Pat. No. 5,082,285 generally discloses the preparation of a solid golf ball from an ultra-high molecular weight polybutadiene having a number average molecular weight of $40 \times 10^4$ or more, which has dispersity characteristics as noted. See also U.S. Pat. Nos. 4,974,852 and 5,585,440, wherein Mooney viscosity is discussed without reference to dispersity.

Accordingly, it is an object of the present invention to provide an improved polybutadiene composition which, when utilized to formulate golf ball cores, produces golf balls exhibiting enhanced C.O.R. without increasing hardness. An additional object of the invention is to produce a golf ball core from a polybutadiene composition having a high Mooney viscosity and/or a high molecular weight and low dispersity.

These and other objects and features of the invention will be apparent from the following summary and description of the invention and from the claims.

SUMMARY OF THE INVENTION

The present invention achieves all of the foregoing objectives and provides, in a first aspect, a golf ball comprising a core formed from a composition that utilizes a particular solid polybutadiene, which prior to curing, has a Mooney viscosity of at least 70 and a dispersity of less than 4. The golf ball also comprises a cover disposed about the core.

In another aspect, the present invention provides a golf ball comprising a core formed from a composition including (i) from about 80 parts to about 120 parts by weight of elastomer components and (ii) at least 60 parts by weight of non-elastomer components. The elastomer components include a solid polybutadiene, which, prior to curing, exhibits a Mooney viscosity of from about 73 to about 85 and a dispersity of about 1.9 to about 3.9. The golf ball further includes one or more polymeric cover layers disposed about the core.

In yet another aspect, the present invention provides a composition adapted for forming a golf ball core. The composition comprises a first certain type of solid polybutadiene having a Mooney viscosity of from about 73 to about 85 and a dispersity of less than 4, and preferably 3.9 or less, a second polybutadiene having a Mooney viscosity of from about 25 to about 65, and at least one crosslinking agent.

In still another aspect, the present invention provides a golf ball comprising a core formed from a solid polybutadiene, a cross-linking agent, a metal soap and zinc oxide, the polybutadiene has a Mooney viscosity of greater than 70, and a polydispersity of from about 1.9 to about 3.9. The golf ball also includes one or more cover layers generally surrounding the core.

In yet another aspect, the present invention provides a composition adapted for forming a golf ball core. The composition comprises a blend of solid polybutadienes, wherein at least one polybutadiene has a Mooney viscosity of at least about 70.

Furthermore, the present invention provides methods for producing the noted golf balls. Such methods generally involve combining the noted polybutadiene with at least one other agent to form a core composition. The core composition is then molded to form a golf ball core, about which a cover is formed to thereby produce the present invention golf balls.

Further scope of the applicability of the invention will become apparent from the detailed description provided below.

DETAILED DESCRIPTION OF THE PREFERRED EMBODIMENTS

The present invention is directed to improved compositions which, when utilized in formulating golf ball cores, produce cores that exhibit enhanced hardness and which also exhibit a relatively high degree of resilience. In this regard, it has been found that the use of a particular solid polybutadiene in a golf ball core composition has the effect of increasing the resiliency of the resultant cores.

The compositions of the present invention comprise one or more rubber or elastomeric components and an array of non-rubber or non-elastomeric components. The rubber components of the core compositions of the invention comprise a particular solid polybutadiene having an ultra-high Mooney viscosity and certain molecular weight characteristics described in detail below, and one or more other optional polybutadienes. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

The preferred polybutadiene resin for use in the present invention composition has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$ (100° C.)], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\sum W_i}{\sum \frac{W_i}{M_i}}$$

where $W_i$ is the molecular weight of a fraction or sample of the polymer and $M_i$ is the total number of fractions or samples.

"Weight average molecular weight," $M_w$, is defined as:

$$M_w = \frac{\sum W_i M_i}{\sum W_i}$$

where $W_i$ and $M_i$ have the same meanings as noted above.

The "Z-average molecular weight," $M_z$, is defined as:

$$M_z = \frac{\sum W_i M_i^2}{\sum W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight, provides an indication of the distribution or rather the "spread" of molecular weights of the polymer under review. A common indicator of the degree of molecular weight distribution of a polymer is its "polydispersity," P:

$$P = \frac{M_w}{M_n}$$

Polydispersity, or "dispersity" as sometimes referred to herein, also provides an indication of the extent to which the polymer chains share the same degree of polymerization. If the polydispersity is 1.0, then all polymer chains have the same degree of polymerization. Since weight average molecular weight is always equal to or greater than the number average molecular weight, polydispersity, by definition, is equal to or greater than 1.0:

$$P \geq 1.0$$

The particular polybutadiene for use in the preferred embodiment compositions of the present invention (i) exhibits a Mooney viscosity of from about 65 to about 85, and preferably from about 70 to about 83; ii) has a number average molecular weight $M_n$ of from about 90,000 to about 130,000; and preferably from about 100,000 to about 120,000; iii) has a weight average molecular weight $M_w$ of from about 250,000 to about 350,000; and preferably from about 290,000 to about 310,000; iv) has a Z-average molecular weight $M_z$ of about 600,000 to about 750,000; and preferably from about 660,000 to about 700,000; and, v) has a peak molecular weight $M_{peak}$ of about 150,000 to about 200,000; and preferably from about 170,000 to about 180,000.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1, 4 bond, more preferably, having a cis-1, 4 polybutadiene content of about 90%, and most preferably, having a cis-1,4 polybutadiene content of at least about 95%. Although not wishing to be bound to any particular theory, the present inventor has also discovered that a preferred polybutadiene, as described herein, is obtained by utilizing a cobalt or cobalt-based catalyst. However, polybutadienes exhibiting the foregoing characteristics, which are obtained by using a lanthanum rare earth catalyst, nickel catalyst, or mixtures thereof, are also encompassed by the present invention. It is also envisioned that other catalysts could be utilized to produce the particular preferred polybutadienes described herein. Examples of such other catalysts include, but are not limited to aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which generally means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex BCP 820, (a cobalt catalyzed polybutadiene) from Shell Chimie of France. The properties and characteristics of this preferred polybutadiene are set forth below in Table 1.

TABLE 1

| Properties of Shell Chimie BCP 820 (Also known as BR-1202X) | |
|---|---|
| Property | Value |
| Mooney Viscosity (approximate) | 73–83 |
| Volatiles Content | 0.5% maximum |
| Ash Content | 0.1% maximum |
| Cis 1,4-polybutadiene Content | 95.0% minimum |

TABLE 1-continued

| Properties of Shell Chimie BCP 820 (Also known as BR-1202X) | | |
|---|---|---|
| Stabilizer Content | 0.2 to 0.3% | |
| Polydispersity | 2.7 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex BR-1220 polybutadiene (a cobalt catalyzed polybutadiene) available from Shell Chemical (see Table 2 below); and Taktene 220 polybutadiene available from Bayer Corp. of Orange, Tex. (see Tables 3A and 3B below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 2

Properties of Cariflex BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML 1 + 4 @ 212° F.)
90% Cure - 10.0–13.0
Polydispersity 2.75–3.0

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 3A

Properties of Taktene 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. –35–45 40 Typical
(ML 1 + 4 @ 212 Deg. F./212° F.)
Specific Gravity - 0.91
Color - Transparent - almost colorless (15 APHA Max.)
Moisture % - 30% Max. ASTM 1416-76 Hot Mill Method

TABLE 3B

Properties of Taktene 220 Polybutadiene

Product Description

A low Mooney viscosity, non-staining, solution polymerized, high cis-1,4-polybutadiene rubber.

Raw Polymer Properties

| Property | Range | Test Method |
|---|---|---|
| Mooney viscosity 1 + 4 (212° F.) | 40 ± 5 | ASTM D 1646 |
| Volatile matter (wt %) | 0.3 max. | ASTM D 1416 |
| Total Ash (wt %) | 0.25 max. | ASTM D 1416 |

Cure[(1)(2)] Characteristics

Minimum torque

| $M_L$ (dN · m) | 9.7 ± 2.2 | ASTM D 2084 |
|---|---|---|
| (lbf · in) | 8.6 ± 1.9 | ASTM D 2084 |

Maximum torque

| $M_H$ (dN · m) | 35.7 ± 4.8 | ASTM D 2084 |
|---|---|---|
| (lbf · in) | 31.6 ± 4.2 | ASTM D 2084 |
| $t_2$1 (min) | 4 ± 1.1 | ASTM D 2084 |
| t'50 (min) | 9.6 ± 2.5 | ASTM D 2084 |
| t'90 (min) | 12.9 ± 3.1 | ASTM D 2084 |

Other Product Features

| Property | Typical Value |
|---|---|
| Specific gravity | 0.91 |
| Stabilizer type | Non-staining |

[(1)]Monsanto Rheometer at 160° C., 1.7 Hz (100 cpm), 1 degree arc, micro-die
[(2)]Cure characteristics determined on ASTM D 3189 MIM mixed compound:
  TAKTENE 220    100 (parts by mass)
  Zinc oxide     3
  Stearic acid   2
  IRB #6 black (N330)  60
  Naphthenic oil 15
  TBBS           0.9
  Sulfur         1.5
* This specification refers to product manufactured by Bayer Corp., Orange, Texas, U.S.A.

An additional polybutadiene for use in the golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60.

Examples of such lanthanide catalyzed polybutadienes obtained by using a neodymium-based catalyst include Neo Cis 40 and Neo Cis 60 from Enichem. The properties of these polybutadienes are given below.

TABLE 4

Properties of Neo Cis

Properties of Raw Polymer

| Microstructure | |
|---|---|
| 1,4 cis (typical) | 97.5% |
| 1,4 trans (typical) | 1.7% |
| Vinyl (typical) | 0.8% |
| Volatile Matter (max) | 0.75% |

TABLE 4-continued

Properties of Neo Cis

| Ash (max) | 0.30% |
|---|---|
| Stabilizer (typical) | 0.50% |
| Mooney Viscosity, ML 1 + 4 at 100° C. | 38–48 and 60–66 |

Properties of compound (typical)

Vulcanization at 145° C.
| Tensile strength, 35' cure, | 16 MPa |
|---|---|
| Elongation, 35' cure, | 440% |
| 300% modulus, 35' cure, | 9.5 MPa |

A preferred embodiment core composition of the present invention generally comprises about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significantly greater proportion than the rubber portion. The rubber components include the previously described ultra-high Mooney viscosity polybutadiene. The non-rubber components are as follows.

It has been found that when certain polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy) valerate, 1,1-bis (t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a1, 1-di-(t-butylperoxy)-3,3,5-trimethyl cyclohexane sold by Akzo Chemie America, Chicago, Ill. The one hour half life of Luperco 231 XL is about 112° C., and the one hour half life of Trigonox 29/40 is about 129° C. An additional preferred peroxide is Trigonox 42-40B from Akzo Nobel of Chicago, Ill. Most preferably, a solid form of this peroxide is used. Trigonox 42-40B is tert-Butyl peroxy-3,5, 5-trimethylhexanoate. The liquid form of this agent is available from Akzo under the designation Trigonox 42S.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, silica, mica barytes, calcium carbonate, or clays. Limestone is ground calcium/magnesium carbonate and is used because it is an inexpensive, heavy filler. Other heavy weight fillers include metal particles, such as powdered tungsten.

As indicated, ground flash filler may be incorporated and is preferably 20 mesh ground up center stock from the excess flash from compression molding. It lowers the cost and may increase the hardness of the ball.

Fatty acids or metallic salts of fatty acids, or metal soaps, may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4"-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

It will be understood that the present invention golf balls may further include one or more interior or mantle layers. Such layers are typically referred to as inner cover layers or outer core layers, depending upon the material from which they are made, and are usually disposed between the core and the cover components of the ball. The mantle layer may further comprise a heavy weight filler. Heavy weight fillers include, but are not limited to, materials such as brass, bronze and tungsten powders. It is also contemplated by the present inventor that the preferred ultra-high Mooney viscosity polybutadiene described herein could be utilized in one or more of these interior mantle layers.

Figure 1:
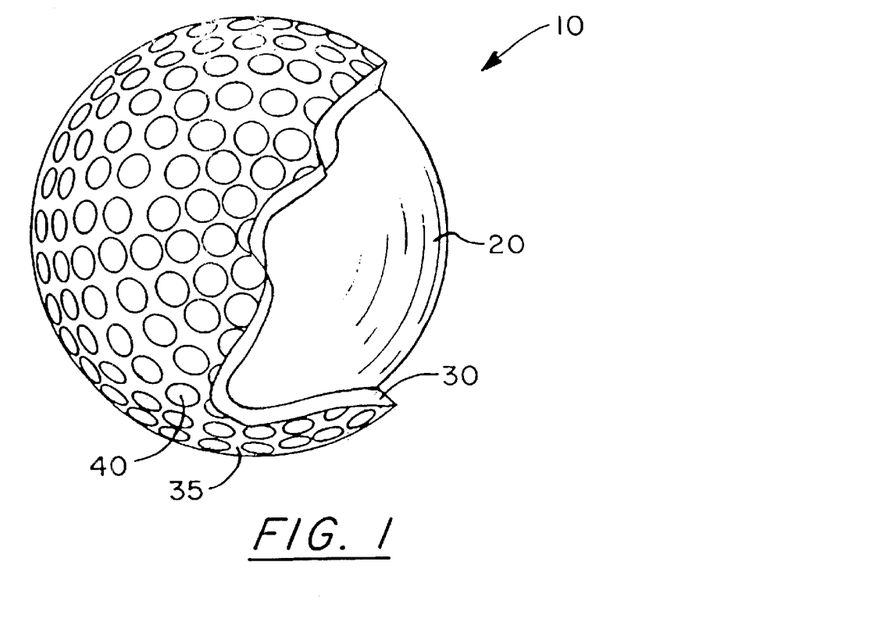
FIG. 1 is a partial sectional view of a first preferred embodiment golf ball in accordance with the present invention.
Figure 2:
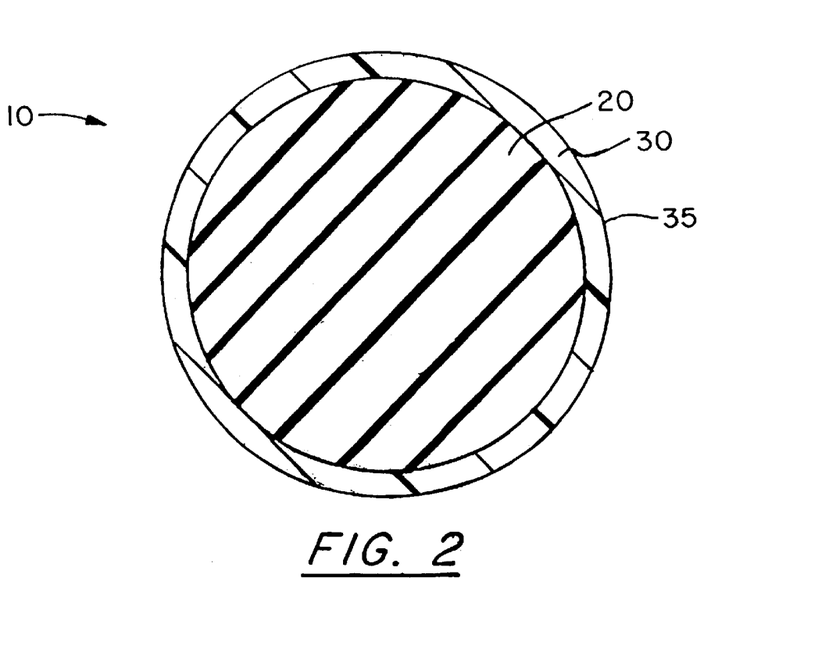
FIG. 2 is a cross sectional view of a first preferred embodiment golf ball.

The present invention is well suited for forming cores for golf balls as described herein. Referring to FIGS. 1 and 2, a first preferred embodiment golf ball 10 is illustrated. It will be understood that all figures are schematics and not necessarily to scale. The first preferred embodiment golf ball 10 comprises a core 20, most preferably as described herein, and a cover layer 30 disposed about the core 20. The core 30 includes an outer surface 35 that defines a plurality of dimples 40 along the outer surface 35 as is known in the art.

Figure 3:
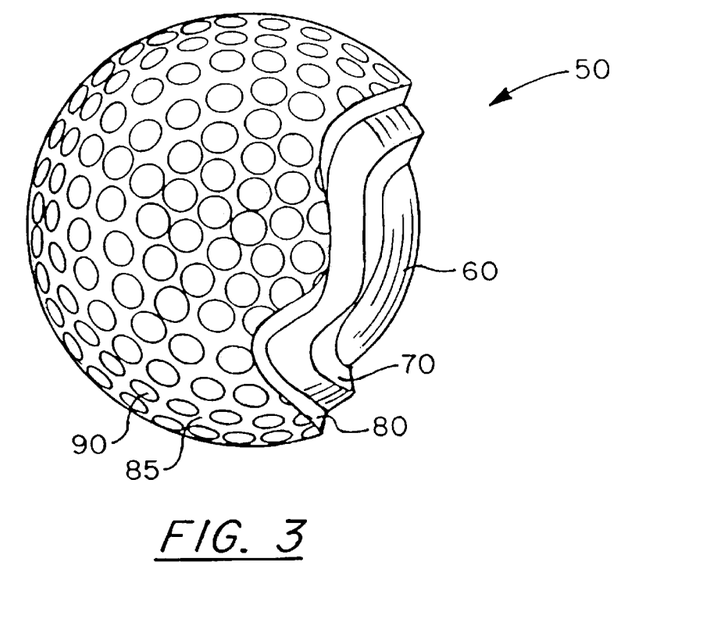
FIG. 3 is a partial sectional view of a second preferred embodiment golf ball in accordance with the present invention.
Figure 4:
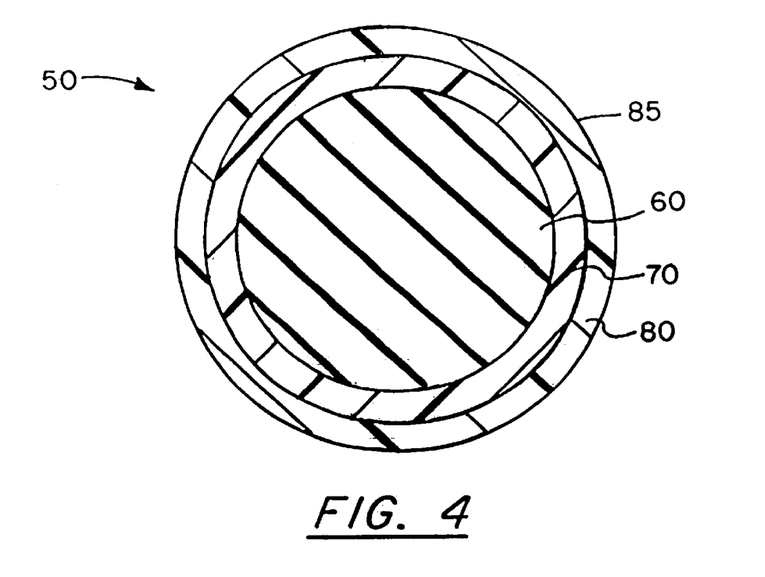
FIG. 4 is a cross sectional view of the second preferred embodiment golf ball.

The present invention core compositions are also well suited for use in multi-layer golf balls such as for example, a second preferred golf ball 50 illustrated in FIGS. 3 and 4. The second preferred embodiment golf ball 50 comprises a core 60, a first inner layer 70 disposed about the core 60, and an outer cover layer 80 disposed about the inner layer 70. The inner layer 70 may include one or more interior layers or mantles. The outer cover layer 80 may include one or more cover layers. The outer layer 80 includes an outer surface 85 that defines a plurality of dimples 90 as known in the art.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer(s), powder resin, fillers, zinc salt, metal oxide, fatty acid, and any other optional components, if desired, are blended for about 7 minutes in an internal mixer such as a Banbury mixer. As a result of shear during mixing, the temperature rises to about 200° F., whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.050 to about 0.250 inch and preferably from about 0.060 to about 0.090 inch.

The composition of the cover may vary depending upon the desired properties for the resulting golf ball. A wide array of cover formulations may be is utilized such as those disclosed in U.S. Pat. Nos. 4,986,545; 5,098,105; 5,120,791; 5,187,013; 5,306,760; 5,312,857; 5,324,783; 5,328,959; 5,330,837; 5,338,610; 5,542,677; 5,580,057; 5,591,803; and 5,733,206, all of which are hereby incorporated by reference.

Ionomeric resins are particularly useful for forming the cover layers of golf balls, including the inner cover layers. Ionomeric resins useful in the present invention include copolymers formed from the reaction of an olefin having 2 to 8 carbon atoms and an acid which includes at least one member selected from the group consisting of alpha, beta-ethylenically unsaturated mono- or dicarboxylic acids with a portion of the acid groups being neutralized with cations. Terpolymer ionomers further include an unsaturated monomer of the acrylate ester class having from 1 to 21 carbon atoms. The olefin preferably is an alpha olefin and more preferably is ethylene. The acid preferably is acrylic acid or methacrylic acid. The ionomers typically have a degree of neutralization of the acid groups in the range of about 10–100%.

The covered golf ball can be formed in any one of several methods known in the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 200° F. to about 300° F.

The golf ball produced is then painted and marked, painting being effected by spraying techniques.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Using the ingredients tabled below, golf ball cores having a finished diameter of about 1.465 to about 1.470 inches were produced by compression molding and subsequent removal of a surface layer by grinding. Each core was formulated using 100 parts elastomer (rubber). In the formulations, the amounts of remaining ingredients are expressed in parts by weight, and the coefficient of restitution (C.O.R.) and compression achieved are set forth below. The properties of the molded cores produced from each formulation were measured according to the following parameters:

Riehle Compression

Riehle compression is a measurement of the deformation of a golf ball in inches under a load designed to emulate the 200 pound spring constant of the Atti or PGA compression testers. For example, a Riehle compression of 47 corresponds to a deflection under load of 0.047 inches.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Durability

Durability was tested by five (5) impacts with an air cannon having a velocity of 135 ft/sec. A "pass" indicates no failure of the core after the impacts.

Tables 5 and 6 summarize the results of testing of four core compositions.

TABLE 5

Composition of Golf Ball Cores

| Component | Trial 1 | 2 | 3 | 4 |
|---|---|---|---|---|
| Cariflex BR-1220[1] | 70 | 100 | — | — |
| Taktene 220[2] | 30 | — | — | 30 |
| Shell BCP 820[3] | — | — | 100 | 70 |
| ZnO (activator filler) | 31.5 | 31.5 | 31.5 | 31.5 |
| Regrind (ground flash) | 16 | 16 | 16 | 16 |
| Zn Stearate (activator) | 16 | 16 | 16 | 16 |
| ZDA (zinc diacrylate) | 21.5 | 21.5 | 21.5 | 21.5 |
| 231 XL (peroxide) | 0.90 | 0.90 | 0.90 | 0.90 |
| Total | 185.9 | 185.9 | 185.9 | 185.9 |

[1]See TABLE 2 for properties of Cariflex BR-1220
[2]See TABLE 3A and 3B for properties of Taktene 220
[3]See TABLE 1 for properties of Shell BCP-820

TABLE 6

Properties of Golf Ball Cores

| Property | Trial 1 Control | 2 | 3 | 4 |
|---|---|---|---|---|
| Size (dia. inches) | 1.493 | 1.492 | 1.492 | 1.492 |
| Weight (grams) | 34.4 | 34.4 | 34.5 | 34.4 |
| Riehle Compression | .099 | .095 | .093 | .096 |
| C.O.R. | 0.778 | 0.781 | 0.787 | 0.782 |
| Durability | Pass | Pass | Pass | Pass |
| Nes Factor[1] | .877 | .876 | .880 | .878 |

[1]Nes Factor is the sum of the C.O.R. and Riehle compression. The higher the number the higher the resilience. This adjusts the results for compression, i.e. Trial #3 is 6 points harder than the control but is 9 points faster in C.O.R. This is a net gain of 3 points. (If the ZDA level is adjusted in each trial so that the compression is exactly the same, then trial #3 would be 3 points higher in C.O.R.)

Tables 7 and 8 summarize the results of testing of core compositions.

TABLE 7

Composition of Golf Ball Cores

| | Trial | |
| --- | --- | --- |
| Component | 1 Control | 2 |
| Cariflex BR-1220 | 70 | — |
| Taktene 220 | 30 | — |
| Shell BCP-820 | — | 100 |
| ZnO | 31.5 | 32.0 |
| Regrind | 16 | 16 |
| Zn Stearate | 16 | 16 |
| ZDA | 21.5 | 20.5 |
| 231XL | 0.90 | 0.90 |
| Total | 185.9 | 185.4 |

TABLE 8

Properties of Golf Ball Cores

| | Trial | |
| --- | --- | --- |
| Property | 1 Control | 2 |
| Size (dia. inches) | 1.542 | 1.543 |
| Weight (grams) | 37.8 | 38.0 |
| Riehle Compression | .093 | .093 |
| C.O.R. | 0.775 | 0.782 |
| Nes factor | .868 | .875 |

Tables 7 and 8 demonstrate that when the ZDA level is adjusted to obtain the same Riehle compression as the Control, the C.O.R. increased 7 points higher for the BCP-820 and the Nes Factor was also 7 points higher.

Tables 9 and 10 summarize the results of additional testing of core compositions.

TABLE 9

Composition of Golf Ball Cores

| | Trial | | |
| --- | --- | --- | --- |
| Component | 1 Control | 2 | 3 |
| Cariflex BR-1220 | 70 | 100 | — |
| Taktene 220 | 30 | — | — |
| Shell BCP-820 | — | — | 100 |
| ZnO | 31.5 | 31.7 | 31.8 |
| Regrind | 16 | 16 | 16 |
| Zn Stearate | 16 | 16 | 16 |
| ZDA | 21.5 | 21.1 | 19.9 |
| 231 XL | 0.90 | 0.90 | 0.90 |
| Total | 185.9 | 185.7 | 184.6 |

TABLE 10

Properties of Golf Ball Cores

| | Trial | | |
| --- | --- | --- | --- |
| Property | 1 Control | 2 | 3 |
| Size (dia. inches) | 1.493 | 1.493 | 1.494 |
| Weight (grams) | 34.5 | 34.4 | 34.3 |
| Riehle Compression | .098 | .104 | .106 |
| C.O.R. | 0.777 | 0.773 | 0.776 |
| Nes Factor | .875 | .877 | .882 |

Tables 9 and 10 demonstrate that, despite adjusting the ZDA level, the Riehle compressions were different. However, the Nes Factor shows that Trial #3 using 100% BCP-820 is 7 points higher than the Control.

Table 11 summarizes additional testing.

TABLE 11

Composition of Golf Ball Cores

| | Trial | |
| --- | --- | --- |
| Component | 1 Control | 2 |
| Cariflex BR-1220 | 70 | — |
| Taktene 220 | 30 | — |
| BCP-820 | — | 100 |
| ZnO | 31.5 | 31.8 |
| Regrind | 16 | 16 |
| Zn Stearate | 16 | 16 |
| ZDA | 20 | 19.4 |
| 231 XL | 0.90 | 0.90 |
| TOTAL | 184.4 | 184.1 |

TABLE 12A

Properties of Cores, Mantled Cores, Molded and Finished Balls

| | Trial | |
| --- | --- | --- |
| Core Property | 1 Control | 2 |
| Size (dia. inches) | 1.508 | 1.511 |
| Weight (grams) | 35.4 | 35.7 |
| Riehle Compression | .105 | 98 |
| C.O.R. | 0.771 | 0.781 |
| Nes Factor | .876 | .879(+3) |

Cores were centerless ground to 1.470' and injection molded with a high modulus clear Ionomer Mantle. See Table 13 for mantle composition.

TABLE 12B

| Mantled Cores | 1 Control | 2 |
|---|---|---|
| Size (dia. inches) | 1.568 | 1.570 |
| Weight (grams) | 38.4 | 38.4 |
| Riehle Compression | .085 | .081 |
| C.O.R. | 0.802 | 0.808 |
| Nes Factor | .887 | .889(+2) |

Mantled cores were injection molded with a soft, low modulus Ionomer cover into dimpled molded golf balls. See Table 13 for cover composition.

TABLE 12C

| Molded Golf Balls | 1 Control | 2 |
|---|---|---|
| Size (dia. inches) | 1.683 | 1.683 |
| Weight (grams) | 45.3 | 45.4 |
| Riehle Compression | .081 | .080 |
| C.O.R. | 0.787 | 0.792 |
| Nes Factor | .868 | .872(+4) |

Molded balls were trimmed, brush tumbled, primed, stamped, and clear coated.

TABLE 12D

| Finished Golf Balls | 1 Control | 2 |
|---|---|---|
| Size (dia. inches) | 1.682 | 1.682 |
| Weight (grams) | 45.6 | 45.7 |
| Riehle Compression | .080 | .080 |
| C.O.R. | 0.786 | 0.790 |
| Nes Factor | .866 | .870(+4) |

TABLE 13

Composition of Mantle and Cover

| Mantle Component | |
|---|---|
| Iotek 1002 | 50 |
| Iotek 1003 | 50 |
| | 100 |
| Cover Component | |
| Iotek 7510 | 41 |
| Iotek 7520 | 41 |
| Iotek 8000 | 8.5 |
| T.G. White M.B. | 9.4 |
| | 99.9 |

It is evident from the proceeding Tables that the high Mooney cobalt catalyzed polybutadiene BCP-820 produces a higher C.O.R. (3–7 points) vs. the low Mooney cobalt catalyzed polybutadiene. Blending with the low Mooney polybutadiene produces less of a gain in C.O.R.

An additional embodiment according to the present invention utilizes blends of the Neo Cis polymers in the core compositions. The following Table represents core formulations which utilizes a blend of Neo Cis 40 and Neo Cis 60 with Cariflex BCP-820 (amounts of ingredients are in parts per hundred rubber (phr) based on 100 parts butadiene rubber):

TABLE 14

| | Formulation No. | | | |
|---|---|---|---|---|
| Ingredient | 1 | 2 | 3 | 4 |
| Cariflex BCP-820 | 40 | 40 | 40 | 40 |
| Neo Cis 60 | 30 | 30 | 30 | 30 |
| Neo Cis 40 | 30 | 30 | 30 | 30 |
| Zinc Oxide | 31.4 | 30.9 | 26 | 24.6 |
| Zinc Stearate | 16 | 16 | 16 | 16 |
| ZDA | 18.2 | 19.2 | 18.2 | 19.6 |
| Yellow MB | 0.14 | — | — | — |
| Green MB | 0.05 | — | — | — |
| Black MB | — | 0.2 | — | — |
| Red MB | — | — | 0.075 | 0.075 |
| Blue MB | — | — | 0.075 | 0.075 |
| Triganox 42-40B | 1.25 | 1.25 | 1.25 | 1.25 |

The core formulations set forth above in Table 14 were then utilized to produce the following corresponding cores:

TABLE 15

| | Core Sample | | | |
|---|---|---|---|---|
| Property | 1 | 2 | 3 | 4 |
| Size (pole dia. inches) | 1.47" ± 0.004 | 1.47" ± 0.004 | 1.47" ± 0.004 | 1.47" ± 0.004 |
| Weight (grams) | 33.3 g ± 0.3 | 33.3 g ± 0.3 | 31.5 ± 0.3 | 31.5 ± 0.3 |
| Riehle Comp. | 135 ± 10 | 125 ± 10 | 145 ± 8 | 135 ± 8 |
| C.O.R. | 0.775 ± 0.015 | 0.765 ± 0.015 | 0.760 ± 0.015 | 0.770 ± 0.015 |
| Specific Gravity | 1.194 ± 0.05 | 1.194 ± 0.05 | 1.168 | 1.168 |

TABLE 15-continued

| | Core Sample | | | |
|---|---|---|---|---|
| Property | 1 | 2 | 3 | 4 |
| JIS C | 69 ± 2 | 71 ± 2 | 70 ± 2 | 71 ± 2 |
| Shore C | 69 ± 2 | 71 ± 2 | 70 ± 2 | 71 ± 2 |
| Shore D | 40 ± 2 | 42 ± 2 | 41 ± 2 | 42 ± 2 |

In a preferred embodiment, the cores utilizing the blend of Neo Cis 40 and Neo Cis 60 have a mantle or inner cover layer formed thereon. A variety of ionomers may be utilized in the mantle or inner cover layer of the multi-layer golf balls according to the present invention. Ionomeric resins such as those designated as Surlyn®, manufactured by DuPont, and Iotek, manufactured by Exxon, are suitable for forming the mantle layer, but any polymer conventionally used to form inner cover layers in the multi-layer golf balls can be used. The following Table 16 includes ionomers which are exemplary of specific ionomers which may be utilized in the inner cover layer of multi-layer balls according to the present invention. These examples are not intended to be limiting of the specific ionomers which can be used.

TABLE 16

| | Individual Ionomers | | |
|---|---|---|---|
| | Iotek 1002 | Iotek 1003 | Surlyn ® 8552 |
| % Acid Type | 18% AA | 18% AA | 19% MA |
| Ionomer Type | Copolymer | Copolymer | Copolymer |
| Cation | Na | Zn | Mg |
| Melt Index | 2 | 1 | 1.3 |
| Stiffness Modulus *2 | 4053 MPa | 1873 MPa | 3499 Kgf/cm$^2$ |

AA = Acrylic Acid; MA = Methacrylic Acid
*2 Stiffness measurements done using Toyoseiki Stiffness Tester The mantle layer may also contain other additives such as heavy weight fillers including bronze, brass, tungsten, and the like.

The following represents various intermediate golf balls formed from the cores of Table 15.

TABLE 17

| | Intermediate Ball with Inner Cover | | | |
|---|---|---|---|---|
| | 1 | 2 | 3 | 4 |
| Core Formulation (From Table 15) | 1 | 2 | 3 | 4 |
| Mantle Composition (Wt %) | | | | |
| Iotek 1002 (Na) | 50% | 50% | 35% | 35% |
| Iotek 1003 (Zn) | 50% | 50% | — | — |
| Surlyn 8552 (Ma) | — | — | 65% | 65% |
| Filler (Bronze Powder) | — | — | 19.0 pph | 19.0 pph |
| TiO$_2$ | — | — | 0.1 pph | 0.1 pph |

The inner cover layers, or mantles, as set forth in Table 17 above have the following characteristics as shown in Table 18 below:

TABLE 18

| | Intermediate Ball (from Table 17) | | | |
|---|---|---|---|---|
| Property | 1 | 2 | 3 | 4 |
| Flex Modulus (weighted avg.) | 264 MPa | 264 MPa | 264 MPa | 264 MPa |
| Stiffness Modulus | 3521 Kgf/cm$^2$ | 3521 Kgf/cm$^2$ | 3521 Kgf/cm$^2$ | 3521 Kgf/cm$^2$ |
| Size (intermediate ball) | 1.570" ± 0.004 | 1.570" ± 0.004 | 1.570" ± 0.004 | 1.570" ± 0.004 |
| Weight (intermediate ball) | 38.3 g ± 0.3 | 38.3 g ± 0.3 | 38.3 g ± 0.3 | 38.3 g ± 0.3 |
| Thickness | 0.050" ± 0.008 | 0.050" ± 0.008 | 0.050" ± 0.008 | 0.050" ± 0.008 |
| Riehle Comp | 122 ± 12 | 112 ± 12 | 112 ± 12 | 106 ± 8 |
| C.O.R. | 0.780 ± 0.015 | 0.790 ± 0.015 | 0.790 ± 0.015 | 0.795 ± 0.015 |
| Mantle Specific Gravity | 0.96 ± 0.01 | 0.96 ± 0.01 | 1.12 ± 0.05 | 1.12 ± 0.05 |
| JIS C | 97 ± 1 | 97 ± 1 | 97 ± 1 | 97 ± 1 |
| Shore C | 97 ± 1 | 97 ± 1 | 97 ± 1 | 97 ± 1 |
| Shore D | 70 ± 1 | 70 ± 1 | 70 ± 1 | 70 ± 1 |

The intermediate balls, as shown in Table 17 were then formed into finished golf balls by covering them with an outer cover formulation. The covers are typically ionomeric but other polymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table 19 includes ionomers which are exemplary of specific ionomers that may be utilized for the outer cover layer of golf balls according to the present invention.

TABLE 20-continued

| Finished Ball | A | B | C | D |
|---|---|---|---|---|
| Surlyn 8549 (Na) | 7.3% | 7.3% | — | — |
| Iotek 7510 (Zn) | 42% | 42% | — | 58.9% |
| Iotek 7520 (Zn) | 50.7% | 50.7% | — | — |
| Surlyn 8940 (Na) | — | — | 17% | — |
| Surlyn 9910 (Zn) | — | — | 50.1% | — |
| Surlyn 8320 (Na) | — | — | 17.9% | — |
| Surlyn 8120 (Na) | — | — | 7.7% | — |
| Iotek 7030 (Zn) | — | — | 7.3% | 7.3% |
| Iotek 8000 (Na) | — | — | — | 33.8% |
| Whitener (TiO$_2$)* | 2.3 phr | 2.3 phr | 2.3 phr | 2.3 phr |

*Amount based on parts per hundred resin

TABLE 19

Outer Cover Ionomers

|  | Surlyn 8940 | Surlyn 9910 | Surlyn 8320 | Surlyn 8120 | Surlyn 8549 | Iotek 7030 | Iotek 7510 |
|---|---|---|---|---|---|---|---|
| % Acid Type | 15% MA | 15% MA | ~7% MA | ~7% MA | 15% MA | 15% AA | 6% AA |
| Ionomer Type | Copolymer | Copolymer | Terpolymer | Terpolymer | Copolymer | Copolymer | Terpolymer |
| Cation | Na | Zn | Na | Na | Na | Zn | Zn |
| Melt Index | 2.8 | 0.7 | 0.8 | 2 | 2.3 | 2.5 | 0.8 |
| Stiffness Modulus *2 | 2705 Kgf/cm$^2$ | 2874 Kgf/cm$^2$ | 168 Kgf/cm$^2$ | 492 Kgf/cm$^2$ | — | 1840 Kgf/cm$^2$ | 284 Kgf/cm$^2$ |

(Table 35 Continued)

|  | Iotek 7520 | Iotek 8000 |
|---|---|---|
| % Acid Type | 6% AA | 15% AA |
| Ionomer Type | Terpolymer | Copolymer |
| Cation | Zn | Na |
| Melt Index | 2 | 2 |
| Stiffness Modulus *2 | 270 MPa | 3323 Kgf/cm$^2$ |

AA = Acrylic Acid; MA = Methacrylic Acid
*2 Stiffness measurements done using Toyoseiki Stiffness Tester The intermediate golf balls of Table 17 were then covered with cover formulations to produce the following finished golf balls:

The finished balls of Table 20 above had the following characteristics:

TABLE 20

| | Finished Ball (from Table 19) | | | |
|---|---|---|---|---|
| Property | A | B | C | D |
| Flex Modulus (weighted avg.) | 58 MPa | 58 MPa | 240 Mpa | 140 MPa |
| Stiffness Modulus (estimate) | ~300 Kgf/cm$^2$ | ~300 Kgf/cm$^2$ | 1820 Kgf/cm$^2$ | 763 Kgf/cm$^2$ |
| Combined Mantle/Cover Stiffness | ~700 Kgf/cm$^2$ | ~700 Kgf/cm$^2$ | 1942 Kgf/cm$^2$ | — |
| Cover Specific Gravity | 0.98 ± 0.01 | 0.98 ± 0.01 | 0.98 ± 0.01 | 0.98 ± 0.01 |
| Size | 1.685" ± 0.005 | 1.685" ± 0.005 | 1.685" ± 0.005 | 1.685" ± 0.005 |
| Weight | 45.4 g ± 0.4 | 45.4 g ± 0.4 | 45.4 g ± 0.4 | 45.4 g ± 0.4 |
| Riehle Compression | 105 ± 10 | 100 ± 10 | 95 ± 5 | 85 ± 5 |
| C.O.R. | 0.770 ± 0.015 | 0.780 ± 0.015 | 0.790 ± 0.015 | 0.790 ± 0.015 |
| JIS C | 72 ± 1 | 72 ± 1 | 93 ± 1 | 87 ± 1 |
| Shore C | 72 ± 1 | 72 ± 1 | 93 ± 1 | 87 ± 1 |
| Shore D | 46 ± 1 | 46 ± 1 | 62 ± 1 | 56 ± 1 |

TABLE 20

| Finished Ball | A | B | C | D |
|---|---|---|---|---|
| Intermediate Ball (from Table 17) | 1 | 2 | 3 | 4 |
| Cover Composition (Wt %) | | | | |

An additional step of exposure to gamma radiation was performed on balls A and B of Table 20 producing golf balls having the following characteristics:

TABLE 21

| Finished Ball (From Table 20) | Finished Balls (Post Gamma) | | | |
|---|---|---|---|---|
| Property (Post Gamma) | A (Ball) | A (Core) | B (Ball) | B (Core) |
| Gamma Dosage (Ball) | 35–70 Kgys | — | 35–70 Kgys | — |
| Size | 1.683" ± 0.003 | 1.47" ± 0.004 | 1.683" ± 0.003 | 1.47 ± 0.004 |
| Thickness (Cover) | 0.057" ± 0.008 | — | 0.057" ± 0.008 | — |
| Weight | 45.5 g ± 0.4 | 33.3 g ± 0.3 | 45.5 g ± 0.4 | 33.3 g ± 0.3 |
| Riehle Compression | 86 ± 5 | 120 ± 10 | 81 ± 5 | 110 ± 10 |
| C.O.R. | 0.795 ± 0.015 | 0.770 ± 0.020 | 0.800 ± 0.015 | 0.780 ± 0.020 |
| Cover Specific Gravity | 0.98 ± 0.01 | — | 0.98 ± 0.1 | — |
| Core Specific Gravity | — | 1.194 ± 0.05 | — | 1.194 ± 0.05 |
| JIS C | 72 ± 1 | 78 ± 2 | 72 ± 1 | 80 ± 2 |
| Shore C | 72 ± 1 | 78 ± 2 | 72 ± 1 | 80 ± 2 |
| Shore D | 46 ± 1 | 48 ± 2 | 46 ± 1 | 50 ± 2 |
| Dimple Pattern | 422 Tri | — | 422 Tri | — |

The method of gamma radiation treatment of golf balls, including benefits and property changes attained therefrom, is taught in commonly assigned U.S. Pat. No. 5,857,925 to Sullivan et al., which is incorporated herein by reference. Benefits and/or property changes associated with gamma radiation treatment of golf balls include, but are not limited to, increased melting temperature for the ionomer cover, increased compression and C.O.R. for the core, allows softer starting materials for core, etc.

In yet another preferred embodiment according to the present invention, golf balls having a core and a cover were formed according to the compositions provided below in Tables 22 to 24 The golf balls designated 1–4 below are for comparative purposes, utilizing blends of polybutadiene rubbers which are not considered to be ultra high Mooney viscosity rubbers.

TABLE 22

| | Cores | | | | | | |
|---|---|---|---|---|---|---|---|
| Materials | 1 | 2 | 3 | 4 | 5 | 6 | 7 |
| Cariflex 1220 | 70 | 70 | 70 | 70 | — | — | — |
| Taktene 220 | 30 | 30 | 30 | 30 | — | — | — |
| BCP 820 (1220X) | — | — | — | — | 40 | 40 | 40 |
| Neo Cis 60 | — | — | — | — | 30 | 30 | 30 |
| Neo Cis 40 | — | — | — | — | 30 | 30 | 30 |
| Regrind | 10 | 20.5 | 20.5 | 17 | 0.2 | — | — |
| Zinc Oxide | 24.33 | 23 | 22.8 | 9.5 | 22.10 | 24 | 24 |
| Tungsten Powder | 0.17 | 0.17 | 0.17 | 0.17 | — | 0.17 | 0.17 |
| Zinc Stearate | 20 | 20 | 20 | 15 | 16.0 | 16.3 | 16.3 |
| ZDA | 22 | 22 | 23.2 | 19 | 24.30 | 20.5 | 20.5 |

TABLE 22-continued

| | Cores | | | | | | |
|---|---|---|---|---|---|---|---|
| Materials | 1 | 2 | 3 | 4 | 5 | 6 | 7 |
| Red MB | — | — | — | — | 0.08 | 0.14 | 0.14 |
| Blue MB | — | — | — | — | 0.08 | — | — |
| Yellow MB | 0.14 | — | — | — | — | — | — |
| Black MB | — | 0.14 | 0.14 | — | — | — | — |
| Orange MB | — | — | — | 3.5 | — | — | — |
| PolyPro 20 Mesh | — | — | — | 0.15 | — | — | — |
| 231 XL or 29/40 | 0.9 | 0.9 | 0.9 | 0.9 | — | — | — |
| Trig 42-40B | — | — | — | — | 1.25 | 1.24 | 1.24 |

*amounts in parts per hundred resin

Golf ball cores having the following properties were produced from the core formulations of Table 22.

TABLE 23

| | (Core) | | | | | | |
|---|---|---|---|---|---|---|---|
| Properties | 1 | 2 | 3 | 4 | 5 | 6 | 7 |
| Size | 1.543" ± 0.008 | 1.543" ± 0.008 | 1.543" ± 0.008 | 1.570" ± 0.008 | 1.540" | 1.56" ± 0.005 | 1.56" ± 0.005 |
| Weight | 36.7 g ± 0.4 | 36.7 g ± 0.4 | 36.7 g ± 0.4 | 35.4 g ± 0.4 | 36.43 g | 38.0 g ± 0.004 | 38.0 g ± 0.004 |
| Riehle Comp. | 96 ± 8 | 105 ± 8 | 92 ± 8 | 115 ± 10 | 97 | 113 ± 9 | 113 ± 9 |
| C.O.R. | 0.795 ± 0.015 | 0.780 ± 0.015 | 0.780 ± 0.015 | 0.773 ± 0.015 | — | 0.780 ± 0.010 | 0.780 ± 0.010 |
| Specific Gravity | 1.168 ± 0.005 | 1.168 | 1.168 | 1.078 ± 0.004 | — | 1.16 | 1.16 |
| JIS C | 79 ± 2 | 77 ± 2 | 80 ± 2 | 77 ± 1 | — | 73 ± 1 | 73 ± 2 |
| Shore C | 79 ± 2 | 77 ± 2 | 81 ± 2 | 79 ± 1 | — | 75 ± 2 | 75 ± 2 |
| Shore D | 49 ± 2 | 48 ± 2 | 50 ± 2 | 45 ± 1 | — | 44 ± 1 | 44 ± 1 |

The cores, as shown in Table 23, were then formed into finished golf balls by covering them with an outer cover formulation. The covers are typically ionomeric but other poloymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table 24 includes ionomers which are exemplary of specific ionomers that may be utilized for the outer cover layer of golf balls according to the present invention.

TABLE 24

| Outer Cover Ionomers | | | | | | | |
|---|---|---|---|---|---|---|---|
| | Surlyn 8940 | Surlyn 9910 | Surlyn 8320 | Surlyn 8120 | Surlyn 8549 | Surlyn 8552/6120 | Surlyn 8140 |
| % Acid Type | 15% MA | 15% MA | ~7% MA | ~7% MA | 15% MA | 19% MA | 19% MA |
| Ionomer Type | Copolymer | Copolymer | Terpolymer | Terpolymer | Copolymer | Copolymer | Copolymer |
| Cation | Na | Zn | Na | Na | Na | Na | Mg |
| Melt Index | 2.8 | 0.7 | 0.8 | 2 | 2.3 | 2.6 | 1.3 |
| Stiffness Modulus *2 | 2705 Kgf/cm² | 2874 Kgf/cm² | 168 Kgf/cm² | 492 Kgf/cm² | — | — | 3499 Kgf/cm² |
| | Iotek 7030 | Iotek 7510 | Iotek 7520 | Iotek 8000 | Iotek 1006 | Iotek 1007 | |
| % Acid Type | 15% AA | 6% AA | 6% AA | 15% AA | 15% AA | 15% AA | |
| Ionomer Type | Copolymer | Terpolymer | Terpolymer | Copolymer | Copolymer | Copolymer | |
| Cation | Zn | Zn | Zn | Na | Na | Zn | |
| Melt Index | 2.5 | 0.8 | 2 | 2 | 1.3 | 0.9 | |
| Stiffness Modulus *2 | 1840 Kgf/cm² | 284 Kgf/cm² | 270 MPa | 3323 Kgf/cm² | 2719 Kgf/cm² | 1498 Kgf/cm² | |

AA = Acrylic Acid; MA = Methacrylic Acid
*2 Stiffness measurements done using Toyoseiki Stiffness Tester Finished golf balls were prepared utilizing the cores from Table 40 above, and cover materials from Table 24 above. The finished golf balls are set forth in Table 25 below.

TABLE 25

| Finished Ball | A | B | C | D | E | F | G | H |
|---|---|---|---|---|---|---|---|---|
| Core (From Table 24) | 1 | 2 | 3 | 4 | 5 | 6 | 7 | 8 |
| Cover Material(s) (Wt %) | | | | | | | | |
| Surlyn 8940 (Na) | 10.3 | — | — | — | 10.3 | — | 22.0 | — |
| Surlyn 9910 (Zn) | 26.8 | — | — | — | 26.8 | — | 54.4 | — |
| Surlyn 8320 (Na) | 38.2 | — | — | — | 38.2 | — | 10 | — |
| Surlyn 8120 (Na) | 15.0 | — | — | — | 15.0 | — | 1.00 | — |
| Surlyn 8549 | — | — | — | — | — | — | — | — |
| Iotek 7030 (Zn) | 9.7 | 9.7 | 9.7 | 9.7 | 9.7 | 9.7 | 9.7 | 9.7 |
| Iotek 7510 | — | — | — | — | — | — | — | — |
| Iotek 7520 | — | — | — | — | — | — | — | — |
| Iotek 8000 | — | — | — | — | — | — | — | — |
| Surlyn 8552/6120 (Mg) | — | 54.2 | 54.2 | — | — | 45.15 | — | 40.7 |
| Surlyn 8140 (Na) | — | 36.1 | 36.1 | — | — | — | — | — |
| Iotek 1006 | — | — | — | 36.1 | — | 45.15 | — | 46.8 |
| Iotek 1007 | — | — | — | 54.2 | — | — | — | — |
| Whitener (TiO₂)* | 3.1phr | 3.1phr | 3.1phr | 3.1phr | 3.1phr | 3.1 phr | 3.1 phr | 3.1phr |

*Parts per hundred resin

The finished golf balls of Table 25 were found to have the following properties:

TABLE 26

| | Finished Golf Balls (From Table 25) | | | | | |
|---|---|---|---|---|---|---|
| Properties | A | B | C | D | F | G |
| Flex Modulus (weighted avg.) | 154 MPa | 472 MPa | 472 MPa | 201 MPa | 379 MPa | 276 MPa |
| Stiffness Modulus | <1820 Kgf/cm² | — | — | — | — | — |
| Specific Gravity (Cover) | 0.98 ± 0.01 | 0.98 ± 0.01 | 0.98 ± 0.01 | 0.99 ± 0.01 | 0.98 ± 0.01 | 0.98 ± 0.01 |
| Size | 1.685" ± 0.005 | 1.685" ± 0.005 | 1.685" ± 0.005 | 1.715" ± 0.005 | 1.685" ± 0.005 | 1.685" ± 0.005 |
| Weight | 45.4 g ± 0.4 | 45.4 g ± 0.4 | 45.4 g ± 0.4 | 45.4 g ± 0.4 | 45.4 g ± 0.4 | 45.4 g ± 0.4 |
| Riehle Comp. | 90 ± 5 | 75 ± 5 | 70 ± 5 | 90 ± 5 | 95 ± 5 | 97 ± 3 |
| C.O.R. | 0.790 ± 0.015 | 0.810 ± 0.010 | 0.810 ± 0.010 | 0.805 ± 0.012 | 0.806 ± 0.009 | 0.803 ± 0.005 |
| JIS C | 85 ± 1 | 99 ± 1 | 99 ± 1 | 95 ± 1 | 95 ± 1 | 91 ± 1 |
| Shore C | 87 ± 1 | 99 ± 1 | 99 ± 1 | 97 ± 1 | 97 ± 1 | 93 ± 1 |
| Shore D | 59 ± 1 | 73 ± 1 | 73 ± 1 | 68 ± 1 | 69 ± 1 | 65 ± 1 |

The invention has been described with reference to the preferred embodiments. Obviously, modifications and alterations will occur to others upon reading and understanding the preceding detailed description. It is intended that the invention be call such alternations and modifications insofar as they come within the scope of the claims and the equivalents thereof.

Having thus described the preferred embodiment, the invention is now claimed to be:

1. A golf ball comprising:

a core formed from a composition including polybutadiene, said polybutadiene consisting essentially of solid polybutadiene and wherein said polybutadiene comprises (i) a first cobalt catalyzed polybutadiene and, (ii) a blend of polybutadienes wherein each polybutadiene in said blend of polybutadienes is catalyzed by a lanthanide series catalyst, further wherein the blend consists of a polybutadiene having a Mooney viscosity of about 40 and a polybutadiene having a Mooney viscosity of about 60; and one or more cover layers disposed about said core.

2. The golf ball of claim 1 wherein said first polybutadiene, prior to curing, has a Mooney viscosity $[ML_{1+4}(100°\,C.)]$ of from about 73 to about 83.

3. The golf ball of claim 1 wherein said first polybutadiene, prior to curing, has a polydispersity of from about 1.9 to about 3.9.

4. The golf ball of claim 3 wherein said first polybutadiene has a polydispersity of from about 2.4 to about 3.1.

5. The golf ball of claim 4 wherein said first polybutadiene has a polydispersity of about 2.7.

6. The golf ball of claim 1 wherein said first polybutadiene, prior to curing, has a number average molecular weight of from about 90,000 to about 130,000.

7. The golf ball of claim 6 wherein said first polybutadiene has a number average molecular weight of from about 100,000 to about 120,000.

8. The golf ball of claim 1 wherein said first polybutadiene, prior to curing, has a weight average molecular weight of from about 250,000 to about 350,000.

9. The golf ball of claim 8 wherein said first polybutadiene has a weight average molecular weight of from about 290,000 to about 310,000.

10. The golf ball of claim 1 wherein said first polybutadiene, prior to curing, has a Z-average molecular weight of from about 600,000 to about 750,000.

11. The golf ball of claim 10 wherein said first polybutadiene has a Z-average molecular weight of from about 660,000 to about 700,000.

12. The golf ball of claim 1 wherein said first polybutadiene, prior to curing, has a peak molecular weight of from about 150,000 to about 200,000.

13. The golf ball of claim 12 wherein said first polybutadiene has a peak molecular weight of from about 170,000 to about 180,000.

14. The golf ball of claim 1 wherein said lanthanide catalyst is neodymium.

15. A golf ball comprising:

a core formed from a composition including polybutadiene, said polybutadiene consisting essentially of solid polybutadiene and wherein said polybutadiene comprises (i) a first cobalt catalyzed polybutadiene having a Mooney viscosity of between about 73 and about 85 and, (ii) a blend of polybutadienes wherein each polybutadiene in said blend of polybutadienes is catalyzed by a lanthanide series catalyst, further wherein the blend consists of a polybutadiene having a Mooney viscosity of about 40 and a polybutadiene having a Mooney viscosity of about 60;

an inner cover layer dispersed about said core comprising a blend of ionomer resins; and an outer cover layer disposed about said inner cover layer.

16. The golf ball of claim 15 wherein said first polybutadiene, prior to curing of said core, has a number average molecular weight of from about 90,000 to about 130,000.

17. The golf ball of claim 15 wherein the inner cover layer comprises at least one high acid ionomer resin in said blend.

18. A golf ball comprising:

a core formed from a composition including polybutadiene, said polybutadiene consisting essentially of solid polybutadiene and wherein said polybutadiene comprises (i) a first cobalt catalyzed polybutadiene having a Mooney viscosity of between about 73 and about 85 and, (ii) a blend of polybutadienes wherein each polybutadiene in said blend of polybutadienes is catalyzed by a neodymium catalyst, further wherein the blend consists of a polybutadiene having a Mooney viscosity of about 40 and a polybutadiene having a Mooney viscosity of about 60;

an inner cover layer dispersed about said core comprising a blend of ionomer resins, wherein at least one of the ionomers in the blend is a high acid ionomer resin; and an outer cover layer disposed about said inner cover layer.

* * * * *